Feb. 10, 1970     J. FORD     3,494,057
TIRE DISPLAY CARD HOLDER
Filed July 24, 1967
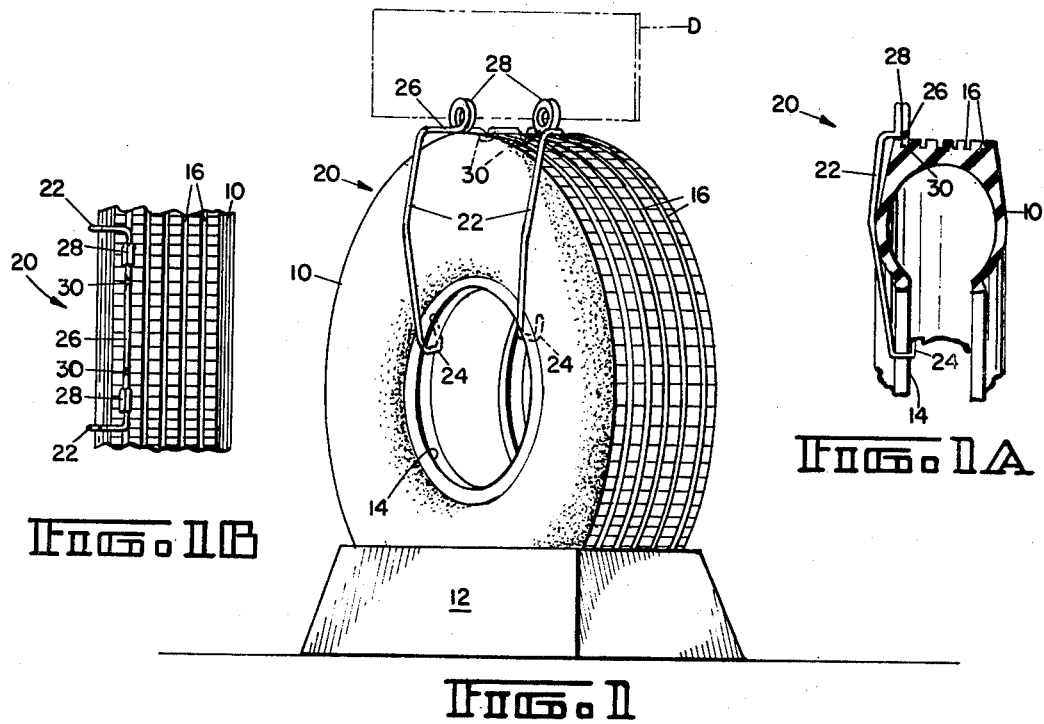
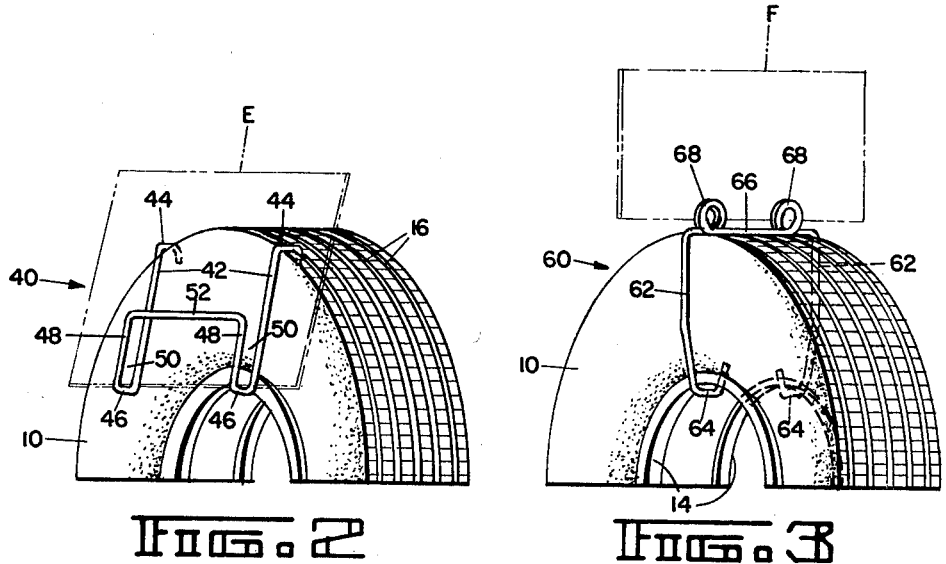
INVENTOR.
JACK FORD
BY Kenwood Ross
ATTORNEY.

United States Patent Office 3,494,057
Patented Feb. 10, 1970

3,494,057
TIRE DISPLAY CARD HOLDER
Jack Ford, Thompsonville, Conn., assignor to Nuger-Ford Products Company, Thompsonville, Conn., a partnership
Filed July 24, 1967, Ser. No. 655,450
Int. Cl. G09f 7/00, 3/18
U.S. Cl. 40—125                1 Claim

ABSTRACT OF THE DISCLOSURE

A display card holder adapted for engagement with an unmounted vehicle tire comprising, a length of light-guage wire formed to releasably engage the tire and having means for releasably supporting a display card.

BACKGROUND OF THE INVENTION

Field of the invention

Card, picture and sign exhibiting wherein inscribed boards, cards, plates or objects convey definite information to the observer.

Description of the prior art

The prior art tire display structures have been, for the most part, limited to card inserts releasably held in the central opening of the tire, or large complicated frame or canopy structures which are expensive and difficult to assemble or disassemble and/or mount on the tire.

SUMMARY OF THE INVENTION

A primary object of the invention is to provide a simple, inexpensive card display holder which may be quickly and easily attached to or detached from an unmounted vehicle tire and to which or from which a display card bearing indicia pertinent to the tire may be quickly and easily attached or detached.

BRIEF DESCRIPTION OF THE DRAWING

FIG. 1 is a view in perspective of a display card holder embodying one form of the invention and shown in association with a vehicle tire;

FIG. 1A is a fragmentary end elevational view thereof, with portions of the tire shown in a section for clarity;

FIG. 1B is a fragmentary top plan view thereof;

FIG. 2 is a fragmentary view in perspective of a display card holder embodying a second form of the invention and shown in association with a vehicle tire; and FIG. 3 is a fragmentary view in perspective of a display card holder embodying a third form of the invention and shown in association with a vehicle tire.

DESCRIPTION OF THE PREFERRED EMBODIMENTS

The display card holders of several embodiments of the invention are designed for association with an unmounted vehicle tire, the holders being adapted to receive and hold display cards bearing advertising material pertinent to the tires with which they are associated.

In FIG. 1, an unmounted vehicle tire 10 of usual construction is preferably supported in an upright position by a stand or base or other suitable support 12, the tire having a central opening 14 therein and being provided with threads 16 on its outer periphery.

A display card holder, generally indicated by 20, is mounted on an upper side edge of the tire and carries a display card D which will bear indicia, not shown, pertinent to the tire.

Holder 20 is preferably, but not necessarily, formed from a single length of light-guage wire shaped to provide a pair of spaced parallel, depending legs 22, 22, each leg being turned inwardly and upwardly at its lower end to form a hook 24 adapted to engage the rim of the tire formed by central opening 14.

An integral cross-piece 26 connects between the upper ends of legs 22, said cross-piece being provided adjacent the legs 22 with a pair of spaced vertically-upright spiral rings 28, 28 formed by coiling the cross-piece and additionally being provided with a pair of spaced depending U-shaped lugs 30, 30 disposed between the spiral rings.

The lugs are receivable in one of the treads 16; the display card is gripped along its lower edge by the coils of the spiral rings; and the hooks 24 engage the rim of the central opening of the tire.

In this embodiment, the display holder is associated with a side face of the tire and holds the display card firmly, but in manner whereby the card can be removed and replaced without removing the holder from the tire.

In the FIG. 2 embodiment, a display card holder, generally indicated by 40, is mounted on an upper side edge of tire 10 and carries a display card E.

Holder 40 is preferably formed from a single length of light-guage wire shaped to provide a pair of spaced, parallel upstanding legs 42, 42, each leg being turned inwardly and downwardly at its upper end to form a hook 44 adapted to engage one of the treads 16 of the tire.

The lower ends of legs 42 are bent outwardly as at 46 and upwardly as at 48 to provide a pair of U-shaped brackets 50, 50 interconnected at their upper ends as by an integral cross-piece 52.

In this embodiment, the lower edge of the display card rests in the brackets 50; the legs 42 rest on the side face of the tire; and the hooks 44 engage in the tread 16, whereby the card may be readily removed from the holder and the holder from the tire.

In the FIG. 3 embodiment, a display card holder, generally indicated by 60, is mounted on an upper end of tire 10 in transversely-extending manner and carries a display card F.

Holder 60 is preferably formed from a single length of light-guage wire shaped to provide a pair of spaced, parallel depending legs 62, 62, each leg being turned inwardly and upwardly at its lower end to form a hook 64 adapted to engage the rim of the tire formed by each of the central openings 14.

An integral cross-piece 66 connects between the upper ends of legs 62, said cross-piece being provided adjacent the legs 62, with a pair of spaced, vertically-upright spiral rings 68, 68 formed by coiling the cross-piece.

The cross-piece may be provided with depending lugs, not shown, similar to the lugs 30 of FIG. 1, for engagement in the treads 16 of the tire, if additional stability is required.

In this embodiment, the cross-piece extends transversely across the tire, the legs 62 gripping each side face thereof; the hooks 64 engage the rims formed by each of the openings 14; and the display card is held firmly along its lower edge by each of the spiral rings 68.

I claim:
1. A display card holder for an unmounted vehicle tire comprising a single length of light-guage wire is shaped to provide a pair of spaced parallel, depending legs, each leg being turned inwardly and upwardly at its lower end to form a hook for engaging the rim of the tire formed by the central opening of the tire, an integral cross-piece connecting between the upper ends of the legs, the cross-piece being provided adjacent the legs with a pair of spaced vertically-upright spiral rings formed by coiling the cross-piece and additionally being provided with a pair of spaced depending U-shaped lugs disposed between the spiral rings and formed by deforming the cross-piece, the lugs being receivable in one of the treads of the tire, and the display card being gripped along its lower edge by the coils of the spiral rings.

References Cited

UNITED STATES PATENTS

| | | |
|---|---|---|
| 1,583,391 | 5/1926 | Cook. |
| 1,735,372 | 11/1929 | Block. |
| 1,802,016 | 4/1931 | Hoffmann. |
| 1,933,474 | 10/1933 | Ekedanl et al. |
| 1,986,432 | 1/1935 | Harrison. |
| 3,102,507 | 9/1963 | Jergitsch. |

EUGENE R. CAPOZIO, Primary Examiner

R. CARTER, Assistant Examiner

U.S. Cl. X.R.

40—11